United States Patent [19]
Stanley

[11] 3,773,581
[45] Nov. 20, 1973

[54] A METHOD OF BUILDING UNITARY-IMPREGNATED FIBER-GLASS STRUCTURE

[76] Inventor: Thomas L. Stanley, 8912 Bocage Pl., New Orleans, La. 70123

[22] Filed: Oct. 14, 1971

[21] Appl. No.: 189,364

[52] U.S. Cl............ 156/71, 9/6, 114/77 R, 156/245, 264/257
[51] Int. Cl................................. B63b 3/02
[58] Field of Search................ 264/257, 258; 114/77 R; 9/6; 156/245, 71, 500; 52/309

[56] References Cited
UNITED STATES PATENTS

| | | | |
|---|---|---|---|
| 3,616,068 | 10/1971 | Glass | 156/441 |
| 3,124,813 | 3/1964 | Graef | 9/6 |
| 3,271,224 | 9/1966 | Bternekull | 156/245 |
| 3,686,051 | 8/1972 | Samuel et al. | 156/245 X |
| 3,154,460 | 10/1964 | Graner et al. | 106/15 AF |
| 3,597,890 | 8/1971 | Hala | 52/309 X |
| 3,643,394 | 2/1972 | Johnson | 52/309 |

Primary Examiner—Edward G. Whitby
Attorney—James B. Lake, Jr.

[57] ABSTRACT

Method of building a large resin impregnated fiber-glass structure by assembling and fastening together framing members, sheathing the fastened framing members with thin sheets of cured resin impregnated fiber-glass, incorporating said thinly sheathed framing into the finished structure by using it as a "lay up" mould for the successive application and curing of resin impregnated fiber-glass material laminations to said sheathing and over all joinings of framing and sheathing.

1 Claim, No Drawings

A METHOD OF BUILDING UNITARY-IMPREGNATED FIBER-GLASS STRUCTURE

The invention relates generally to a method of building resin impregnated fiber-glass structures too large to conveniently mould in their entirety or in sections, and more particularly to a method of building a resin impregnated fiber-glass marine vessels.

It is old in the art to mould in their entirety small fiber-glass boats, and larger structures such as tank trailers and railroad cars and boats in sections. The sections are fastened together by various means to form a whole structure in which the joints and seams run from end to end and/or transversely around, although it is well-known that staggering joints and seams makes a more homogeneous and unitary structure.

It is an object of the invention to build a resin impregnated fiber-glass ship or other large structure as an homogeneous whole rather than mould it as a whole.

A further object of the invention to eliminate large moulds and the expense of producing them in the production of large structures composed of resin impregnated fiber-glass material.

Other objects and a more complete knowledge of the invention may be had by referring to the following specifications and claims.

Although the method will be explained in connection with building a ship it should be understood that the method is not restricted thereto but applies equally to producing any large framed structure of resin impregnated fiber-glass.

The production of large fiber glass structures has been restricted by the necessity of building either large injection moulds or equally large "lay up" moulds, the costs and mechanical difficulties of which are prohibitive.

The invention comprises the method of using the framing of a structure covered by thin sheets of cured resin impregnated fiber-glass as the "lay up" mould for said structure. The sheathing is then thickened and the joints made rigid and homogenous with the forming and sheathing by the application of successive laminations of fiber glass material impregnated with resin and allowed to dry or cure. The number of lminations in each case is based on the designed strength and scantling or wall thickness of the structure.

Thus in bulidng a large boat or ship by the method of the invention, the transverse members, such as the frames and bulkheads are moulded conventionally. The longitudinal members, such as the keel, chines, stringers and longitudinal bulkheads are similarly moulded as are also the bow and stern members. The longitudinal and transverse members are lightly fastened together in their relative positions in the structure. Resin impregnated fiber glass material can be used as a cement at the intersecting parts of the members, or conventional fastening such as screws, and bolts and nuts. Thin cured sheets of resin impregnated fiber-glass are then cemented or otherwise fastened to the outside of the framing structure, making it in effect a "lay up" mould that is incorporated into the finished marine vessel by thickening the sheathing with successive laminations of resin impregnated fiber-glass material. The laminations are preferably applied to the interior surfaces of the thin sheets and overlap the toe of each of the respective framing members to close the respective joints between the framing members and sheathing. The overlap may be continuous to increase both the width and thickness of a framing member or extend only along the side of a framing member to increase its thickness. Whereas a transverse bulkhead is encountered, the sheath thickening is extended only along the adjacent side to bridge the joint therebetween. All joints between the framing members are likewise laminated over to unit the edges of each joint into a homogeneous unitary structure. The thickening of the sheathing may be applied exteriorly on the thin sheets, in which case the joints between the thin sheets and the frames and bulkheads are bridged with successive laminations as described for bridging the framing joints.

The same method described for building a vessel can be followed in the building of any large structure such as a house, railroad car, or tank truck. First the framing is moulded and assembled and lightly fastened in place. The complete frame is sheathed with thin sheets of cured resin impregnated fiberglass material by lightly fastening them to the exterior of the framing. The sheathing is then thickened to the desired strength factor by successively applied laminations and all joints are similarly laminated over to form an homogenecus structure.

It is preferred that all materials be resin impregnated fiber-glass in order for the framing, sheathing and the bonding therebetween be both chemically and structurally homogeneous. If necessary, other materials can be substituted for the framing members which can be bonded together with successive resin impregnated fiber-glass laminations and similarly bonded to the sheathing.

I claim:

1. Method of building a unitary resin-impregnated fiber-glass structure comprising the following steps: moulding framing members and interior walls having a designed strength for said structure; assembling said framing members and interior walls in their respective structural positions to form a frame; initially joining said framing members and interior walls sufficiently to hold them together; initially covering said frame with a plurality of abutting sheets of cured resin-impregnated fiber-glass sheathing thereby producing a framed lay-up mould; applying to the interior of said mould to cover said sheathing and all joinings of framing members, interior walls and abutting sheets, successive layers of uncured resin-impregnated fiber glass cloth, allowing each said layer to cure before applying the next, thereby incorporating said mould into a unitary structure having a strength proportional to the numbers of said layers applied.

* * * * *